Aug. 12, 1924.  
W. NICHOLAS  
1,504,703  
KNIFE FEEDING MECHANISM FOR RUBBER AND FABRIC CUTTING MACHINES  
Filed March 20, 1923

Inventor  
William Nicholas  
By Chamberlain & Newman  
Attorneys

Patented Aug. 12, 1924.

1,504,703

UNITED STATES PATENT OFFICE.

WILLIAM NICHOLAS, OF BRIDGEPORT, CONNECTICUT, ASSIGNOR TO THE BLACK ROCK MFG. CO., OF BRIDGEPORT, CONNECTICUT, A CORPORATION OF CONNECTICUT.

KNIFE-FEEDING MECHANISM FOR RUBBER AND FABRIC CUTTING MACHINES.

Application filed March 20, 1923. Serial No. 626,305.

*To all whom it may concern:*

Be it known that WILLIAM NICHOLAS, a subject of the King of Great Britain, and resident of Bridgeport, in the county of Fairfield and State of Connecticut, has invented certain new and useful Improvements in Knife-Feeding Mechanism for Rubber and Fabric Cutting Machines, of which the following is a specification.

The present invention relates to an improved cutting mechanism for rubber ring and tape cutting machines, and is an improvement in part upon the type of machine shown in an application filed by Hammond and Nicholas, March 15th, 1923, Serial No. 625,204, for a machine for cutting rubber rings.

In this machine the rubber rings are cut from a rubber tube mounted upon a rotating mandrel, and adapted to be intermittently engaged by a circular cutting knife, mounted upon a carriage which is intermittently fed longitudinally of the mandrel. The knife is not positively rotated, but is adapted to be intermittently turned through frictional contact with the rotating tube. In practice the knife rotates in the manner of a pair of meshing gears, and works very satisfactorily on some cases of rubber tubing but does not work so well on tubing made up in part of rolled sheet fabric or materials other than rubber.

The object of the present invention is to provide a knife which is intermittently rotated to bring new cutting surfaces into position independently of the rotation of the tube to be cut, and is rotated slightly during its movement into engagement with the tube, and also during the cutting action, in the same direction of rotation as the tube, see arrow Fig. 1, so that its cutting surface cuts into the tube in opposed direction to the rotating movement of the tube, and a more positive and uniform cutting results. By this form of cutter I am better able to cut wound rolls of sheet fabric to produce, as for instance, tapes, binding, gaskets and the like.

A further object is to provide such improvements which will be of simple construction and operation, and which may be incorporated as an attachment with the type of machine disclosed in my copending application.

With the above and other objects in view, an embodiment of the invention is shown in the accompanying drawings, and this embodiment will be hereinafter more fully described with reference thereto, and the invention will be finally pointed out in the claims.

In the drawings:—

Similar reference characters indicate corresponding parts throughout the several figures of the drawings.

Figure 1:
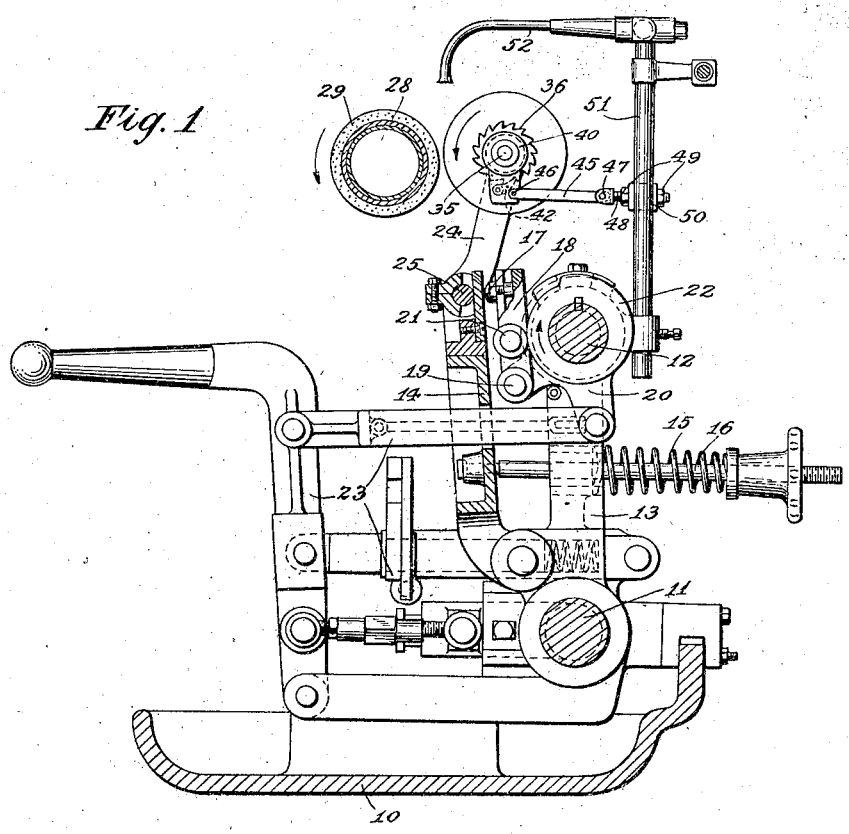
Fig. 1 is a vertical sectional view of the type of machine disclosed in the co-pending joint application of Hammond and Nicholas, and showing the improved cutting mechanism incorporated therein.
Figure 2:
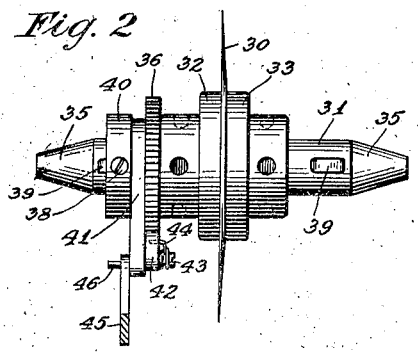
Fig. 2 is a front view of the cutting knife and its associated parts, removed from the machine.
Figure 3:
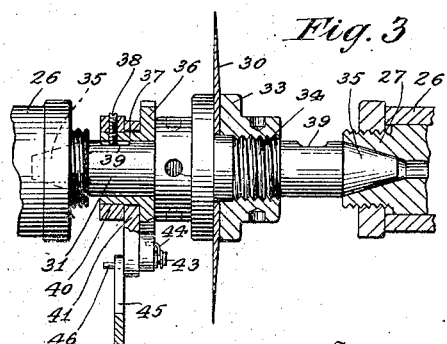
Fig. 3 is a view partially in section of the cutting knife and its supporting bearings.

Referring to the drawings, and more particularly to Fig. 1, thereof, the bed 10 of the machine supports at its ends a forward feed screw shaft 11, and a return feed screw shaft 12, both adapted to be driven by suitable mechanism, as disclosed in the co-pending joint application of Hammond and Nicholas, and having mounted thereon a carriage 13 movable longitudinally of the machine.

A rocker plate 14 is pivotally mounted upon the carriage, a spring 15 mounted on a rod 16 yieldably holding the same in engagement with the contact element 17 of a rocker lever 18, pivotally mounted at 19 upon a rotary collar 20, and having a roller 21 intermediate its ends engaging the cam 22 which is adapted to be rotated by the shaft 12.

The collar 20 is connected to mechanism 23 adapted at the end of the feed of the carriage to rotate the collar and move the lever 18 into inoperative position with relation to the rocker plate 14. The cam 22 has a slow rise and a quick drop and is adapted during each rotation to move the plate forward slowly and then return it quickly to its rearward position.

A knife supporting yoke bracket 24 is adjustably mounted at 25 on the rocker plate, and is provided at its ends with adjustable cone-bearings 26 and 27, in which the ends of the knife supporting arbor are rotatably mounted.

The mandrel 28 upon which the rubber tube is mounted, is adapted to be driven in counter-clockwise direction, as indicated by the arrow, by suitable mechanism as disclosed in said co-pending application.

The circular cutting knife 30 is mounted upon an arbor 31 between a flange 32 formed on the arbor and a collar 33 screwed upon a threaded portion 34 on the arbor, the ends of the arbor being cone-shaped and rotatably engaging the bearings 26 and 27.

A ratchet 36 is provided on the arbor at one side of the knife, its hub 37 being fixed to the same by means of a set-screw 38 engaging one of the flats 39 provided at each end thereof. The set-screw also secures a retaining collar 40, behind which there is rotatably mounted upon the hub a lever 41 carrying a pawl 42, pivoted upon a pin 43 and held yieldably in engagement with the ratchet by means of a spring 44.

A connecting rod 45 is pivotally connected at one end to a pin 46 provided on the lever 41, and pivotally connected at its other end to the forked end 47 of a screw 48, adjustably secured by nuts 49 to a clamp 50, engaged upon the post 51 of the carriage. This post supports a lubricant pipe 52 designed to feed water or other lubricant to the cutter.

In operation, the forward feed of the knife through the action of the cam 22 causes the lever 41 to be rotated on the arbor, and through engagement of the pawl with the ratchet the knife is rotated through a partial revolution during the forward feed, in the direction of the arrow, so that it positively cuts into the surface of the rubber tube in opposed direction to its rotation, and continues this opposed movement as it cuts through the tube. During the rearward movement of the knife the pawl rides over the ratchet to engage another tooth so that upon the next forward movement a new cutting surface is brought into action. The cutting of the rubber rings is positive and uniform, and the life of the knife is very considerably increased.

I have illustrated a preferred and satisfactory embodiment of the invention, but it is obvious that changes may be made therein, within the spirit and scope thereof, as defined in the appended claims.

Having thus described my invention, what I claim and desire to secure by Letters Patent is:—

1. In a machine of the character described, a rotatable tube supporting mandrel, a circular cutting knife, means adapted to impart inward and outward movement to the knife to engage and disengage it with the tube, and means adapted to intermittently rotate said knife during its inward movement through a partial revolution independently of the rotation of the tube.

2. In a machine of the character described, a rotatable tube supporting mandrel, a circular cutting knife, means adapted to impart inward and outward movement to the knife to engage and disengage it with the tube, and means adapted to intermittently rotate said knife during its inward movement through a partial revolution in the same direction of rotation as the mandrel.

3. In a machine of the character described, a rotatable tube supporting mandrel, a circular cutting knife, means adapted to impart inward and outward movement to the knife to engage and disengage it with the tube, and ratchet mechanism adapted to rotate said knife through a partial revolution during its inward movement.

4. In a machine of the character described, a rotatable tube supporting mandrel, a circular cutting knife, means adapted to impart inward and outward movement to the knife to engage and disengage it with the tube, a ratchet fixed with relation to the knife, a rotary pawl carrier having a pawl engaging said ratchet, and means whereby forward movement of the knife causes the pawl and ratchet to rotate the knife through a partial revolution.

5. In a machine of the character described, a rotatable tube supporting mandrel, a carriage, a knife support mounted on said carriage, a knife adjustably mounted on said support, means adapted to actuate said support to move the knife into and out of engagement with the tube, a ratchet fixed with relation to said knife, a rotary pawl carrier having a pawl engaging said ratchet, and adjustable means connecting said pawl carrier to said carriage, whereby forward movement of the knife causes the pawl and ratchet to rotate the knife through a partial revolution.

Signed at Bridgeport, in the county of Fairfield and State of Connecticut this 17th day of March, A. D., 1923.

WILLIAM NICHOLAS.

Witnesses:
GUY L. HAMMOND,
MARY E. CULLEN.